US008369088B2

(12) United States Patent
Wang

(10) Patent No.: US 8,369,088 B2
(45) Date of Patent: Feb. 5, 2013

(54) ELECTRONIC DEVICE

(75) Inventor: Peng Wang, Shenzhen (CN)

(73) Assignees: Fu Tai Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 250 days.

(21) Appl. No.: 12/873,336

(22) Filed: Sep. 1, 2010

(65) Prior Publication Data
US 2011/0304959 A1 Dec. 15, 2011

(30) Foreign Application Priority Data
Jun. 10, 2010 (CN) .......................... 2010 1 0196889

(51) Int. Cl.
G06F 1/16 (2006.01)
H05K 5/00 (2006.01)
H05K 7/00 (2006.01)
H01M 2/10 (2006.01)

(52) U.S. Cl. ................. 361/679.58; 361/679.55; 429/97

(58) Field of Classification Search .......... 361/679.33–679.45, 679.55–679.58; 429/97–100
See application file for complete search history.

(56) References Cited

U.S. PATENT DOCUMENTS

| | | | | |
|---|---|---|---|---|
| 5,208,116 A * | 5/1993 | Joh | ................................. | 429/96 |
| 5,225,293 A * | 7/1993 | Mitchell et al. | .................. | 429/97 |
| 5,294,496 A * | 3/1994 | Sato | ................................. | 429/65 |
| 5,535,437 A * | 7/1996 | Karl et al. | ................... | 455/575.1 |
| 5,578,391 A * | 11/1996 | Meyers et al. | ................... | 429/97 |
| 5,716,730 A * | 2/1998 | Deguchi | ........................... | 429/97 |
| 5,829,997 A * | 11/1998 | Okano et al. | ................... | 439/310 |
| 6,302,454 B1 * | 10/2001 | Tsurumaru et al. | ............ | 292/175 |
| 6,479,184 B1 * | 11/2002 | Shiue | ............................. | 429/123 |
| 6,602,635 B1 * | 8/2003 | Laitinen et al. | ................ | 429/123 |
| 7,318,731 B2 * | 1/2008 | Lin et al. | .......................... | 439/97 |
| 7,322,835 B2 * | 1/2008 | Lin et al. | .......................... | 439/96 |
| 7,531,268 B2 * | 5/2009 | Huang | ............................. | 429/97 |
| 7,554,287 B2 * | 6/2009 | Duesselberg | ................. | 320/107 |
| 7,561,419 B2 * | 7/2009 | Lee et al. | .................. | 361/679.58 |
| 7,914,919 B2 * | 3/2011 | Wang | ............................ | 429/100 |
| 2004/0214077 A1 * | 10/2004 | Huang | ............................. | 429/97 |
| 2006/0055369 A1 * | 3/2006 | Duesselberg | ................. | 320/112 |
| 2006/0166083 A1 * | 7/2006 | Zhang et al. | .................... | 429/97 |
| 2006/0250531 A1 * | 11/2006 | Hsu et al. | ....................... | 348/844 |
| 2007/0026299 A1 * | 2/2007 | Park et al. | ......................... | 429/97 |
| 2007/0091556 A1 * | 4/2007 | Wu | ................................ | 361/683 |
| 2008/0076015 A1 * | 3/2008 | Tien et al. | ...................... | 429/100 |
| 2009/0059482 A1 * | 3/2009 | Hsu et al. | ....................... | 361/679 |
| 2009/0255084 A1 * | 10/2009 | Gee et al. | ......................... | 15/412 |

* cited by examiner

*Primary Examiner* — Adrian S Wilson
(74) *Attorney, Agent, or Firm* — Altis Law Group, Inc.

(57) ABSTRACT

An electronic device includes a first part, a second part, and a connecting mechanism configured to connect the first part with the second part. The connecting mechanism includes a connecting element installed on the first part, a movable element installed on the second part, and a drive element installed on the first part. The drive element is capable of moving the movable element from a first position of the second part to a second position of the second part. When the movable element is located in the first position, the movable element is latched by the connecting element. When the movable element is located in the second position, the movable element is unlatched by the connecting element.

20 Claims, 7 Drawing Sheets

US 8,369,088 B2

ELECTRONIC DEVICE

BACKGROUND

1. Technical Field

The present disclosure relates to an electronic device.

2. Description of Related Art

Electronic devices such as laptop computers are often equipped with removable parts such as rechargeable batteries. The rechargeable battery of the laptop computer is removably mounted in the laptop computer with a latch. However, for some users it may be an inconvenience or even difficult to operate the latch to remove the rechargeable battery from the laptop computer.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
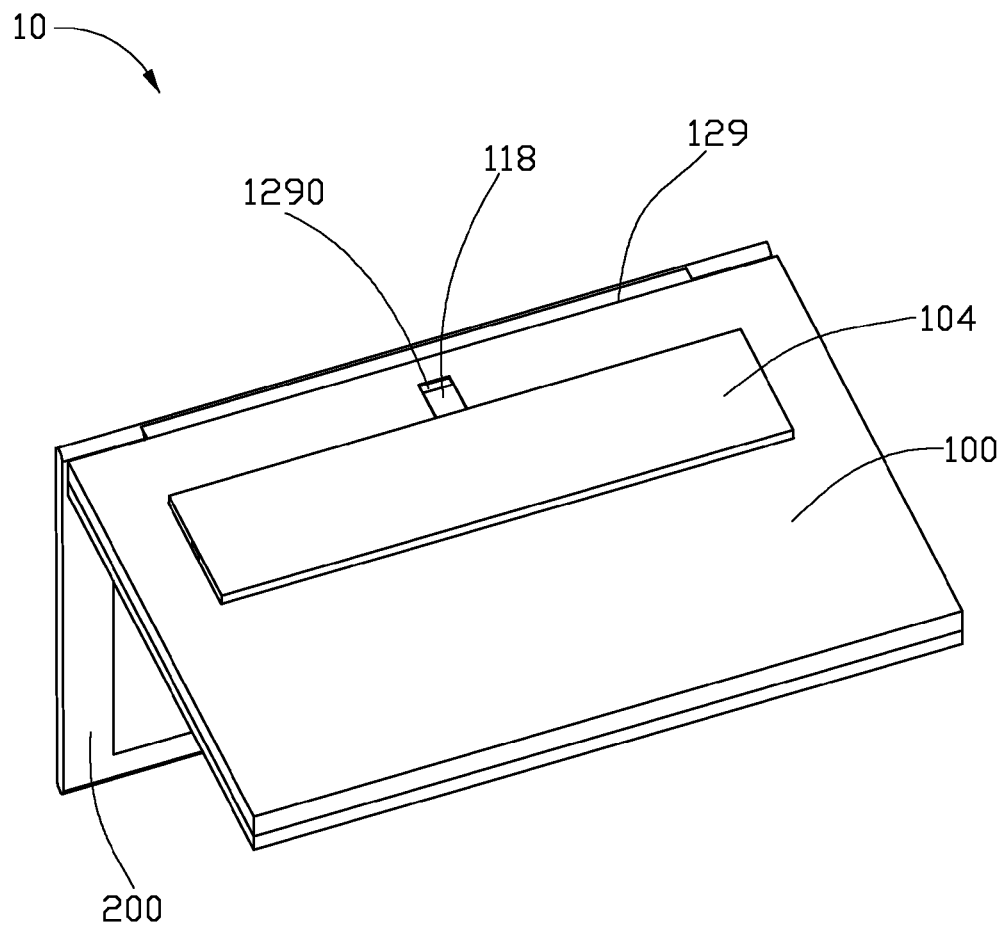
FIG. 1 is a perspective view of one exemplary embodiment of an electronic device in a first state.

FIG. 1 is a perspective view of one exemplary embodiment of an electronic device 10 in a first state. The electronic device 10 includes a host body 100 and a monitor 200 hinged on the host body 100. In the first state, the monitor 200 is hinged away from the host body 100. The electronic device 10 may be a laptop computer, a mobile phone, or a personal digital assistant (PDA), for example. In the exemplary embodiment, the electronic device 10 is a laptop computer.

Figure 2:
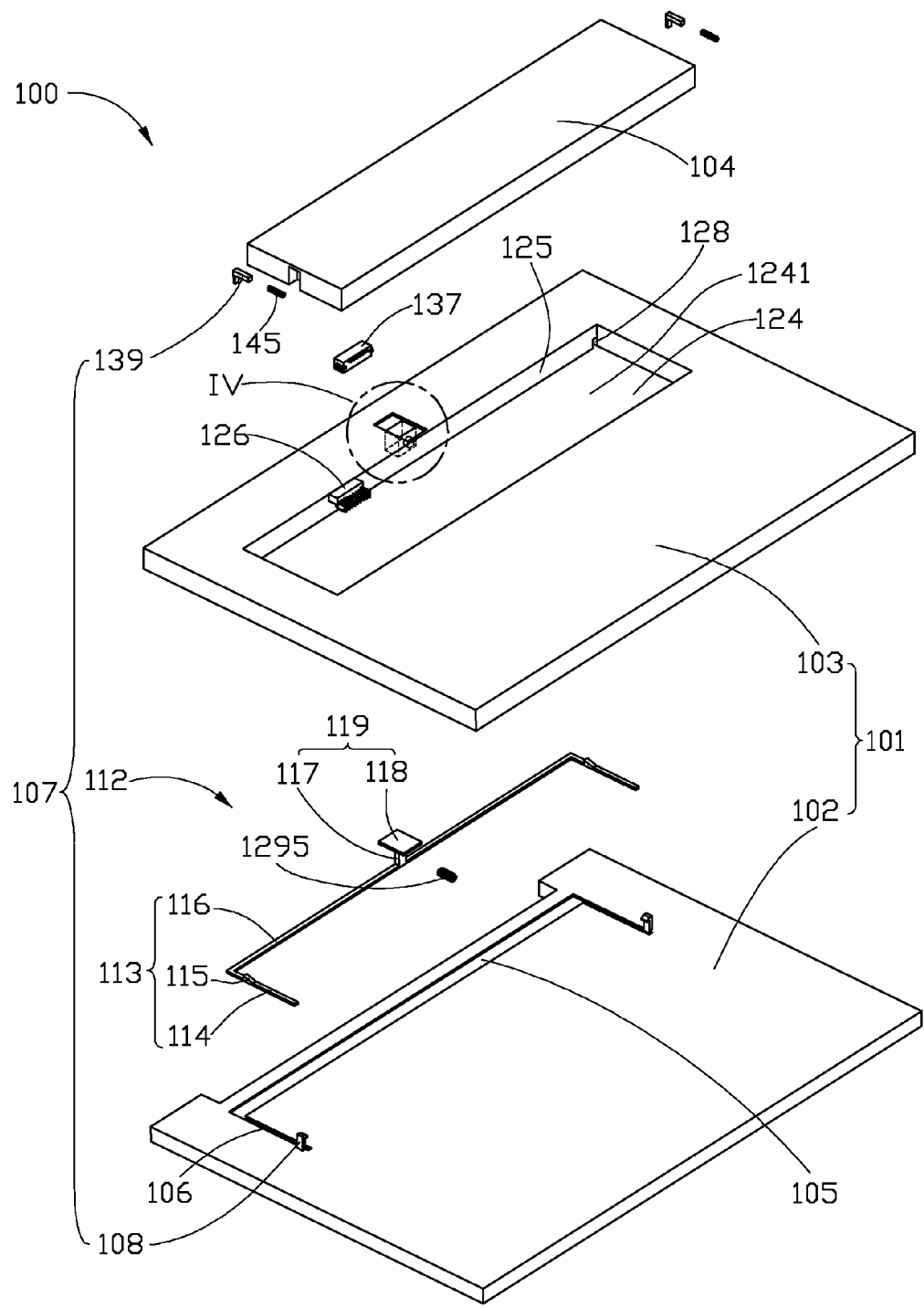
FIG. 2 is an exploded perspective view of a host body of FIG. 1.

FIG. 2 is an exploded perspective view of the host body 100 of FIG. 1. The host body 100 includes a first part 101, a second part 104, and a connecting mechanism 107 connecting the first part 101 with the second part 104. The second part 104 is rectangular. In the exemplary embodiment, the first part 101 is a housing of the host body 100 and the second part 104 is a rechargeable battery.

The first part 101 includes a receiving portion 102 and a cover portion 103. The receiving portion 102 may be fixed with the cover portion 103 by fasteners. The receiver portion 102 and the cover portion 103 may also be integrally formed.

The receiving portion 102 disposes a first slot 105 at one side of the receiver portion 102 near the monitor 200. Two second slots 106 parallel further perpendicularly extend from the first slot 105, away from the monitor 200. The depth of the first slot 105 is the same as that of the two second slots 106.

The cover portion 103 defines an opening 124 at one side thereof near the monitor 200. The opening 124 is rectangular, such that four edges of the opening 124 and a top surface of the receiving portion 102 cooperatively define a receiving space 1241 to receive the second part 104. A first conductor 126 is installed on an edge 125 of the opening 124. The first conductor 126 connects with a circuit board (not shown) received in the cover portion 103. Two first grooves 128 are individually installed on two ends of the edge 125.

Figure 3:
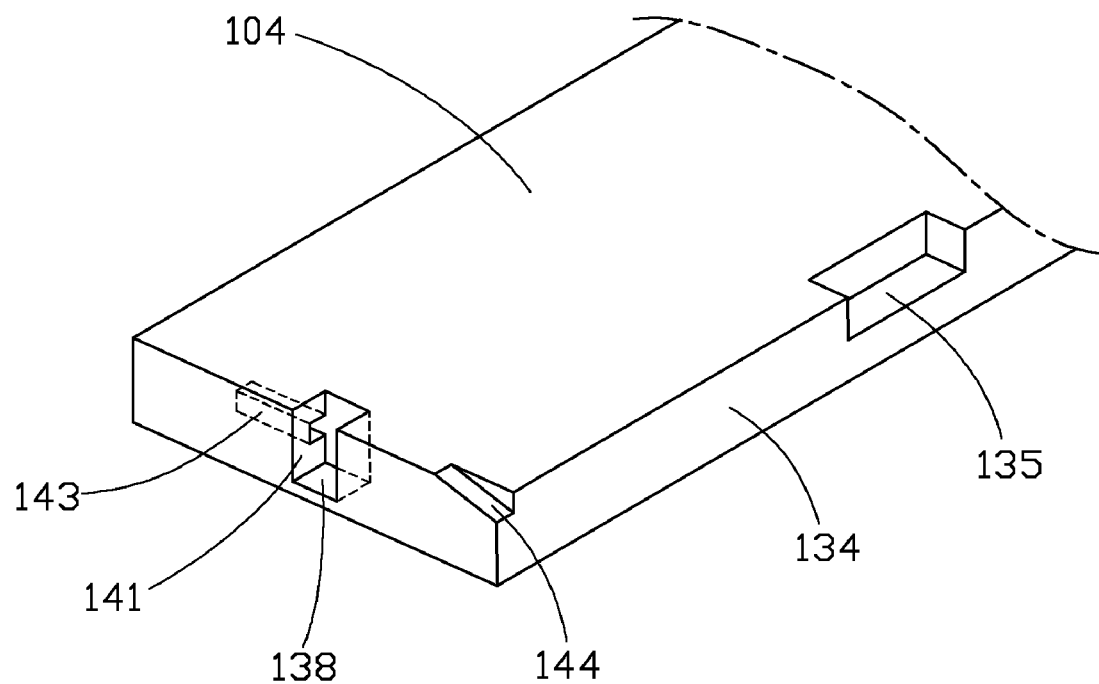
FIG. 3 is an enlarged sectional view of a second part shown in FIG. 2.

FIG. 3 is an enlarged sectional view of the second part 104 shown in FIG. 2. A second groove 135 is installed on a long side 134 of the second part 104. The second groove 135 is configured to receive a second conductor 137. The second conductor 137 is configured to electronically connect with the first conductor 126, and therefore the second part 104 may electronically connect with the first part 101. The first conductor 126 and the second conductor 137 are both connectors. Two third grooves 138 are individually installed on two short sides of the second part 104. Two first receiving grooves 143 are individually installed on the two sides 141 of the two third grooves 138 and configured to receive a first elastic element 145. Two third slots 144 are individually installed on two ends of the side 134.

Figure 4:
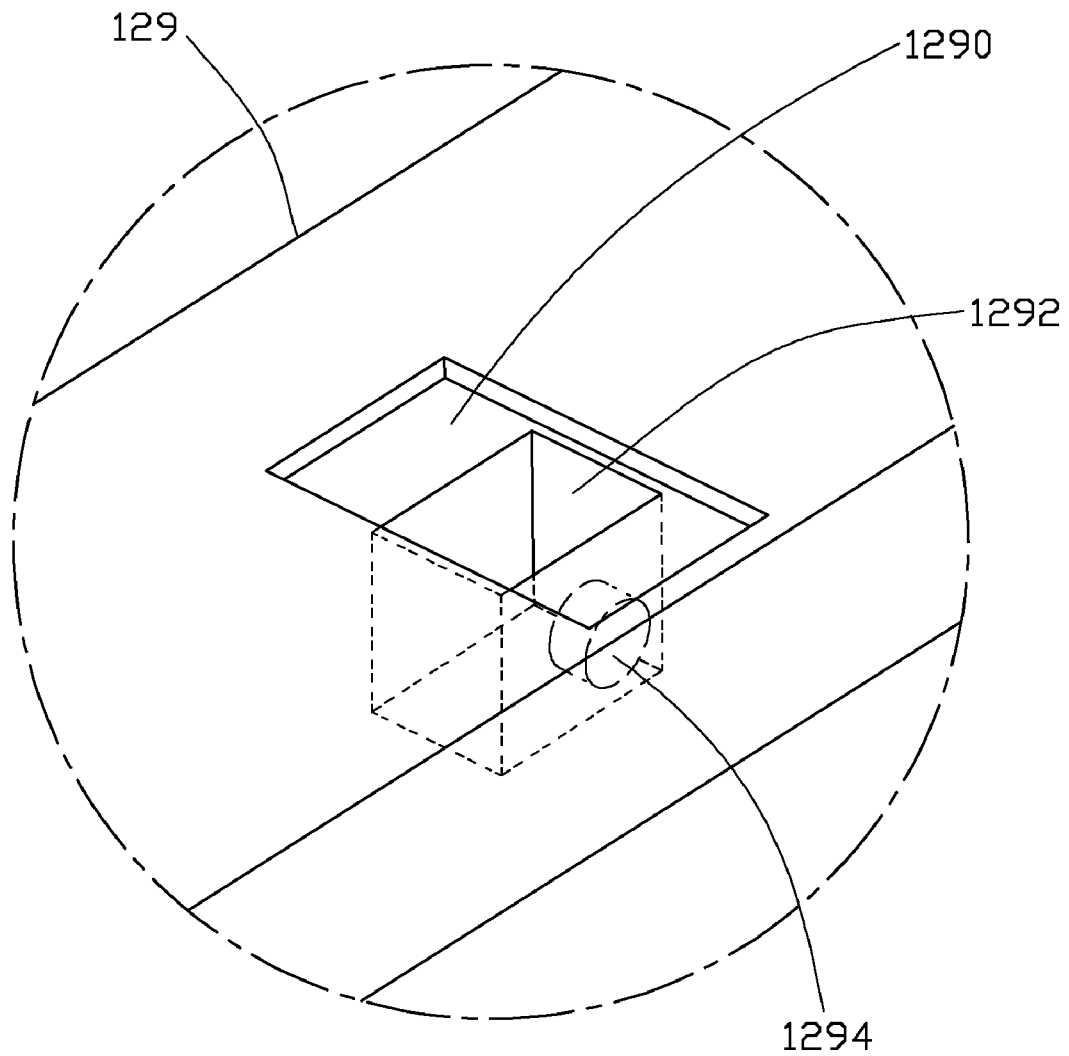
FIG. 4 is an enlarged sectional view of section IV shown in FIG. 2.

FIG. 4 is an enlarged sectional view of section IV shown in FIG. 2. A fourth slot 1290 is installed between a side 129 of the cover portion 103 and the opening 124. A fourth groove 1292 is installed on the bottom of the fourth slot 1290. A second receiving groove 1294 is installed on one side of the fourth groove 1292 away from the side 129. The second receiving groove 1294 is configured to receive a second elastic element 1295. One end of the second elastic element 1295 is fixed on the bottom of the second receiving groove 1294. In the exemplary embodiment, the second elastic element 1295 is a compression spring and fixed on the bottom of the second receiving groove 1294 by using adhesive.

Referring to FIG. 2, the connecting mechanism 107 includes two connecting elements 108, two movable elements 139, and a drive element 112. The two connecting elements 108 are installed on the receiving portion 102. In the exemplary embodiment, the connecting elements 108 are elastic hooks and are installed opposite each other in each of the two second slots 106.

The two movable elements 139 are individually received in the two third grooves 138. The movable element 139 includes a first edge and a second edge perpendicularly extending from the first edge. The length of the first edge is greater than that of the third groove 138. The first edge may be inserted in the first receiving groove 143 to be an abutting portion to cooperate with the connecting element 108. The second edge may be inserted in the second slot 106. One end of the first elastic element 145 is fixed on the bottom of the first receiving grooves 143 and other end of the first elastic element 145 abuts the movable element 139. In the exemplary embodiment, the first elastic element 145 is also a compression spring and fixed on the bottom of the first receiving groove 143 by adhesive. The length of the first elastic element 145 is smaller than the depth of the first receiving grooves 143.

The drive element 112 includes a drive bar 113 and an operating element 119. The drive bar 113 includes two first arms 114 parallel to each other and a second arm 116 connecting the two first arms 114. A protrusion 115 is installed on one end of the first arm 114 near the second arm 116. The protrusion 115 is wedge-shaped and received in the first groove 128 when the second part 104 is positioned in the first part 101. The shape of the third slots 144 matches that of the protrusion 115. The protrusion 115 may be moved in the third slot 144 to urge the second part 104, so that the second part 104 may be removed from the first part 101.

The operating element 119 includes an operating portion 118 and a connecting portion 117 perpendicularly extending from the operating portion 118. The connecting portion 117 connects with the middle of the second arm 116. The connecting portion 117 is received in the fourth groove 1292 and may be moved toward the second receiving groove 1294 along the fourth groove 1292. The operating portion 118 is received in the fourth slot 1290. The length and width of the fourth slot 1290 exceed those of the operating portion 118, so that the operating portion 118 may be moved along the longitudinal axis of the fourth slot 1290.

The second arm 116 is received in the first slot 105. The width of the second arm 116 is smaller than that of the first slot 105 and the length of the second arm 116 is smaller than or equal to that of the first slot 105. As a result, the second arm 116 may be moved along the width direction of the first slot 105. The height of the second arm 116 is approximately equal to the depth of the first slot 105.

The lengths of the two first arms 114 are equal. The first arm 114 is received in the second slot 106. The width of the first arm 114 is smaller than or equal to that of the second slot 106, so that the first arm 114 may be moved along the length direction of the second slot 106. The height of the first arm 114 is smaller than or equal to the depth of the second slot 106. As a result, the first arm 114 may be installed under the second part 104 without interfering with the second part 104. The second arm 116 is moved along the width direction of the first slot 105 and the first arm 114 is moved along the length direction of the second slots 106 when the operating portion 118 is moved.

The first elastic element 145 is received in the first receiving grooves 143 in a relaxed state, wherein the first elastic element 145 is not compressed. The movable element 139 is received in the third grooves 138. The first conductor 126 connects with the second conductor 137 and is completely received in the second groove 135 when the second part 104 is received in the opening 124. The second arm 116 is received in the first slot 105 and the first arm 114 is received in the second slot 106 when the cover portion 103 is fixed on the receiving portion 102. The connecting portion 117 passes through the fourth groove 1292 and the second elastic element 1295 abuts the connecting portion 117 in the relaxed state, wherein the second elastic element 1295 is not compressed. One end of the first arm 114 away from the second arm 116 abuts the second edge of the movable element 139.

Figure 5:
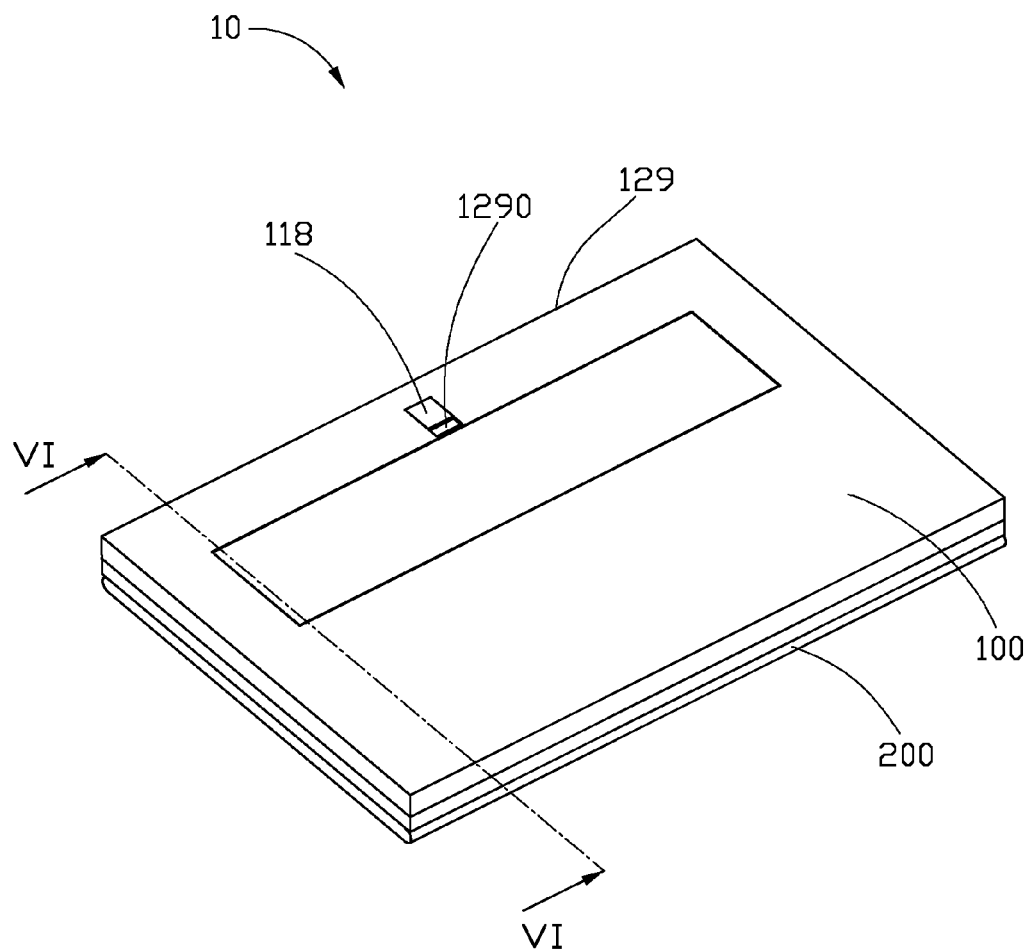
FIG. 5 is a perspective view of the electronic device shown in FIG. 1 in a second state.

FIG. 5 is a perspective view of the electronic device 10 shown in FIG. 1 in a second state. In the second state, the monitor 200 is hinged against the host body 100 and the second part 104 is already received in the host body 100.

Figure 6:
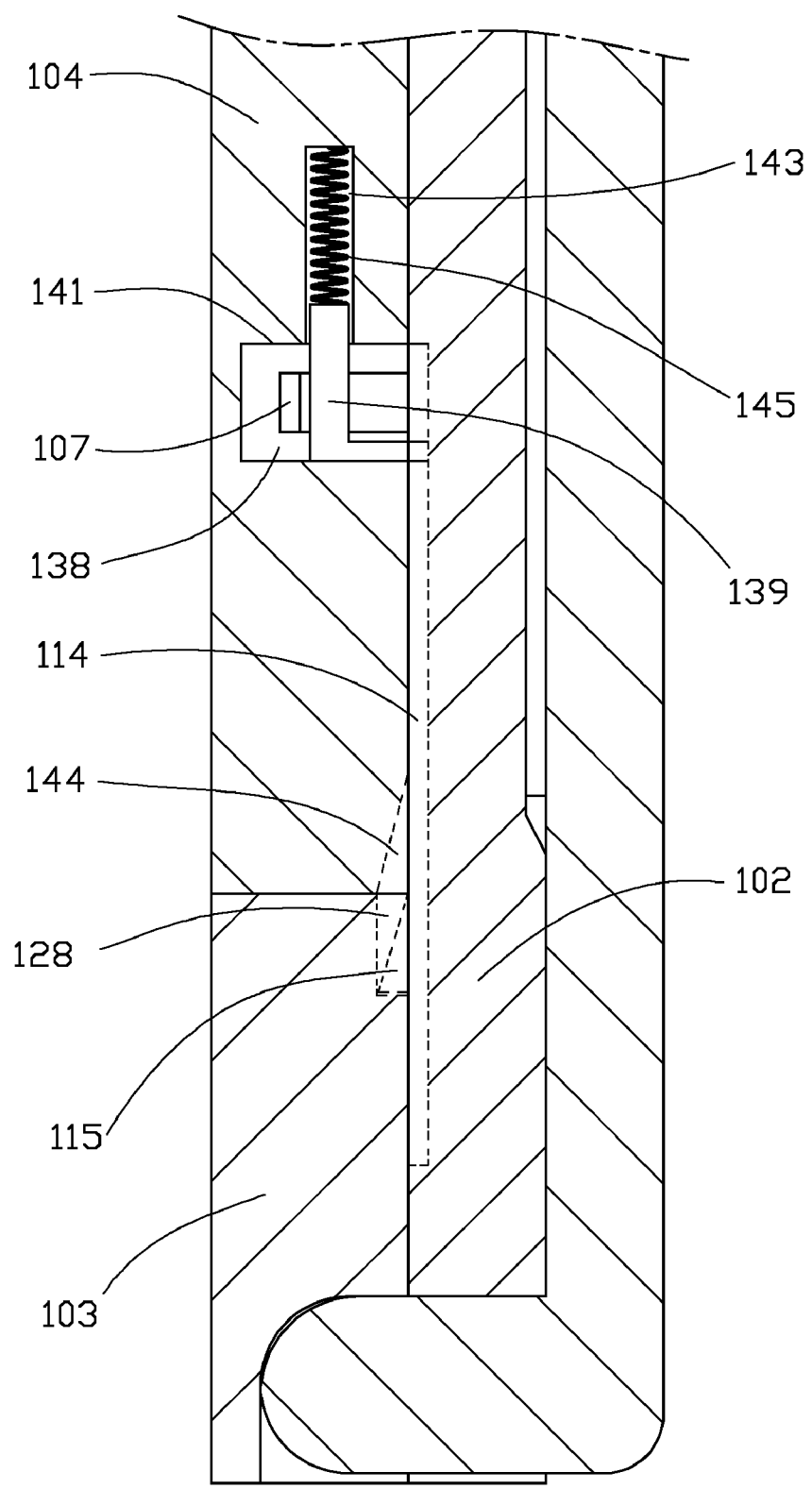
FIG. 6 is a cross-sectional view of the electronic device shown in FIG. 5 with the second part latched.

FIG. 6 is a cross-sectional view taken along the line VI-VI of the electronic device 10 shown in FIG. 5 with the second part 104 latched. The first elastic element 145 and the second elastic element 1295 are in the relaxed state. One end of the first edge of the movable elements 139 abuts one end of the first elastic element 145. The second edge of the movable element 139 abuts one side of the third groove 138 opposite to the sides 141. One side of the second edge of the movable element 139 is located at one end of the second slot 106 away from the first slot 105. One end of the first arm 114 away from the second arm 116 abuts the second edge of the movable element 139. The connecting element 108 latches the first edge of the movable element 139. The lowest end of the protrusion 115 is located at an opening of the third slot 144 without being received therein. The operating portion 118 is located at one end of the fourth slot 1290 near the side 129.

The drive element 112 is located in the first position of the first part 101 and the movable element 139 is located in the first position of the second part 104. The second part 104 is received in the cover portion 103.

Figure 7:
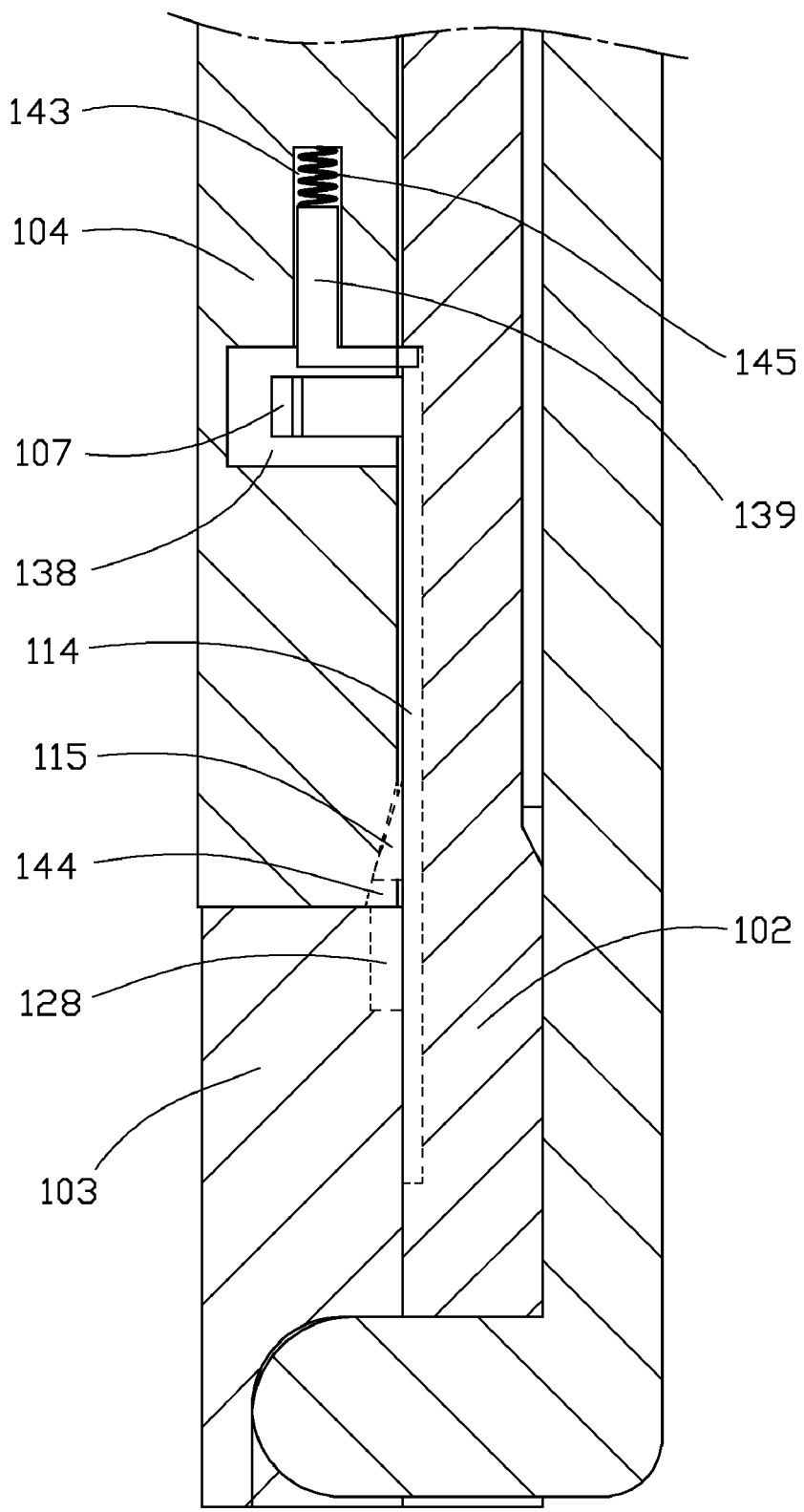
FIG. 7 is a cross-sectional view of the electronic device shown in FIG. 5 with the second part unlatched.

FIG. 7 is a cross-sectional view taken along the line VI-VI of the electronic device 10 shown in FIG. 5 with the second part 104 unlatched. The second elastic element 1295 is compressed by the connecting portion 117 and the drive element 112 is moved away from the monitor 200 when the operating portion 118 is moved away from the side 129 by an external force. The first arm 114 moves the movable element 139 toward the first elastic element 145. The protrusion 115 is moved from the first groove 128 to the third slot 144 and continues moving in the third slot 144 until the movable element 139 is completely separated from the connecting element 108. The drive element 112 is moved from the first position of the first part 101 to the second position of the first part 101 to move the movable element 139 from the first position of the second part 104 to the second position of the second part 104. The operating portion 118 is now located at one end of the fourth slot 1290 away from the side 129. The protrusion 115 urges the second part 104 out of the cover portion 103. The second elastic element 1295 moves the drive element 112 from the second position of the first part 101 to the first position of the first part 101 when the external force is not maintained. The operating portion 118 moves back to one end of the fourth slot 1290 near the side 129. The second part 104 is urged to out of the cover portion 103.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An electronic device, comprising:
    a first part defining an opening to form a receiving space;
    a second part movably received in the receiving space; and
    a connecting mechanism configured to connect the first part with the second part;
    wherein the connecting mechanism comprises:
        a connecting element installed on the first part adjacent to the receiving space;
        a movable element installed on the second part, and capable of moving from a first position of the second part to a second position of the second part;
            wherein the movable element is latched by the connecting element when the movable element is located at the first position; and
            wherein the movable element is unlatched by the connecting element when the movable element is located at the second position; and
        a drive element installed on the first part capable of moving the movable element from the first position of the second part to the second position of the second part.

2. The electronic device of claim 1, wherein the drive element is capable of moving from a first position of the first part to a second position of the first part.

3. The electronic device of claim 2, further comprising an elastic element installed between the drive element and the first part, and capable of moving the drive element from the first position of the first part to the second position of the first part.

4. The electronic device of claim 3, wherein the drive element comprises a drive bar abutting the movable element and forming a protrusion facing the opening to move the second part away from the first part.

5. The electronic device of claim 4, wherein the first part comprises a receiving portion defining a first slot to receive the drive bar.

6. The electronic device of claim 4, wherein the drive element further comprises an operating element connecting with the drive bar.

7. The electronic device of claim 6, wherein the operating element comprises an operating portion and a connecting portion perpendicularly extending from the operating portion.

8. The electronic device of claim 7, wherein the first part forms a second slot adjacent to the opening to receive the operating element, with the operating element capable of moving in the second slot.

9. The electronic device of claim 8, further comprising a first elastic element installed between the connecting portion and the second slot.

10. The electronic device of claim 5, wherein the connecting mechanism further comprises a second elastic element installed between the movable element and the second part, and capable of moving the movable element from the second position of the second part to the first position of the second part.

11. The electronic device of claim 10, wherein the second part forms a third slot to receive the movable element and the second elastic element.

12. The electronic device of claim 11, wherein the movable element is L-shaped.

13. The electronic device of claim 12, wherein the third slot comprises a first groove for receiving the second elastic element and a first end of the movable element, and a second groove for receiving a middle part of the movable element, and a second end of the movable element is received in the first slot.

14. The electronic device of claim 13, wherein the movable element comprises a first edge and a second edge perpendicularly extending from the first edge, and end of the first edge is received in the first groove, and the length of the first edge is greater than the length of the first groove.

15. The electronic device of claim 14, wherein the connecting element comprises a hook to latch the first edge.

16. The electronic device of claim 4, wherein the protrusion is wedge-shaped.

17. The electronic device of claim 16, wherein the second part is rectangular and comprises a slope at a bottom corner thereof corresponding to the protrusion.

18. The electronic device of claim 17, wherein the movable element is unlatched and the second part is gradually urged out of the receiving space by the protrusion when the drive element moves from the first position of the second part to the second position of the second part.

19. The electronic device of claim 5, wherein the drive bar and the first slot are both U-shaped, and correspond to three boundaries of the receiving space.

20. An electronic device, comprising:
a first part defining an opening to form a receiving space;
a second part movably received in the receiving space;
a connecting mechanism configured to connect the first part with the second part, wherein the connecting mechanism comprises:
two connecting elements installed on the first part at two opposite sides of the receiving space; and
two movable elements installed on opposite sides of the second part, and capable of moving from a first position of the second part to a second position of the second part;
wherein the two movable elements are correspondingly latched by the two connecting elements when the two movable elements are located at the first position; and
wherein the two movable elements are unlatched by the two connecting elements when the two movable elements are located at the second position; and
a drive element installed on the first part, the drive element comprising two arms capable of moving the two movable elements from the first position of the second part to the second position of the second part.

* * * * *

UNITED STATES PATENT AND TRADEMARK OFFICE
CERTIFICATE OF CORRECTION

PATENT NO.        : 8,369,088 B2          Page 1 of 1
APPLICATION NO.   : 12/873336
DATED             : February 5, 2013
INVENTOR(S)       : Peng Wang It is certified that error appears in the above-identified patent and that said Letters Patent is hereby corrected as shown below:

On the title page please replace Item (73) regarding "Assignees" with the following:

(73) Assignees: Fu Tai Hua Industry (Shenzhen) Co., Ltd., Shenzhen (CN);
Hon Hai Precision Industry Co., Ltd., New Taipei (TW).

Signed and Sealed this
Twenty-sixth Day of November, 2013

Margaret A. Focarino
*Commissioner for Patents of the United States Patent and Trademark Office*